Feb. 27, 1968

L. M. SHERMAN 3,370,789

MENSTRUAL CALCULATOR

Filed Oct. 10, 1966

INVENTOR.
LAWRENCE M. SHERMAN
BY

Feb. 27, 1968     L. M. SHERMAN     3,370,789

MENSTRUAL CALCULATOR

Filed Oct. 10, 1966     8 Sheets-Sheet 2

INVENTOR.
LAWRENCE M. SHERMAN
BY

Feb. 27, 1968 L. M. SHERMAN 3,370,789
MENSTRUAL CALCULATOR
Filed Oct. 10, 1966 8 Sheets-Sheet 3

INVENTOR.
LAWRENCE M. SHERMAN
BY
Russell, Chittick & Pfund

Feb. 27, 1968  L. M. SHERMAN  3,370,789
MENSTRUAL CALCULATOR

Filed Oct. 10, 1966  8 Sheets-Sheet 4

INVENTOR.
LAWRENCE M. SHERMAN
BY

Feb. 27, 1968 L. M. SHERMAN 3,370,789
MENSTRUAL CALCULATOR
Filed Oct. 10, 1966 8 Sheets-Sheet 5

INVENTOR.
LAWRENCE M. SHERMAN
BY

Feb. 27, 1968     L. M. SHERMAN     3,370,789

MENSTRUAL CALCULATOR

Filed Oct. 10, 1966     8 Sheets-Sheet 7

INVENTOR.
LAWRENCE M. SHERMAN
BY

Feb. 27, 1968        L. M. SHERMAN        3,370,789
MENSTRUAL CALCULATOR

Filed Oct. 10, 1966        8 Sheets-Sheet 8

INVENTOR.
LAWRENCE M. SHERMAN
BY

United States Patent Office 3,370,789
Patented Feb. 27, 1968

3,370,789
MENSTRUAL CALCULATOR
Lawrence M. Sherman, 209 Maple St.,
Needham, Mass. 02192
Filed Oct. 10, 1966, Ser. No. 585,449
11 Claims. (Cl. 235—85)

ABSTRACT OF THE DISCLOSURE

A menstrual calculator for indicating periods of fertility and infertility during menstrual cycles of varying duration. In one embodiment of the invention three superposed, independently rotatable, coaxial disks are utilized. The lower disk has a month-day calendar scale, while the intermediate disk has a plurality of fertile period increments and a corresponding plurality of shortest and longest cycle indicia. Means are provided on the upper disk for increasing the apparent length of the fertile period increments on the intermediate disk by one day for each day that a selected longest cycle indicia numerically exceeds a selected shortest cycle indicia.

---

The invention relates in general to calculators and more particularly to a menstrual calculator for determining periods of fertility and infertility during menstrual cycles of varying duration.

Although the emphasis in recent medical research has been directed towards mechanical and chemical means for contraception, such as, for example, intrauterine devices and orally introduced steroids, a large percentage of the population finds such methods of limiting conception unacceptable for a variety of reasons including religious prohibitions, esthetic distaste and undesirable physiological reactions. Thus, for many couples, the so-called "rhythm system" of contraception provides the only acceptable means of family planning.

The operative success of the "rhythm system" is dependent upon, first, ascertaining the woman's period of fertility and then observing complete abstinence during the fertile period. The period of fertility is fundamentally related to ovulation, that is, the rupture of a Graafian follicle and the concomitant release of an ovum. If this event can be accurately predicted in advance, then the necessary period of abstinence can be established by taking into account the life expectancy of the spermatozoa and the ovum itself. However, at the present time, there is no simple and reliable test for accurately predicting the time when ovulation will occur or for determining the exact moment of ovulation. Until such a test is devised, the "rhythm system" must depend upon certain assumptions derived from currently available empirical medical evidence.

It has been found that in a statistically significant group of women, ovulation usually occurs sometime between the fourteenth and sixteenth days before the onset of the next succeeding menstrual cycle. Since these three days upon which ovulation could occur are temporally related to the onset of the next menstrual cycle, the determination of this event is the touchstone of the "rhythm system." Fortunately, on the basis of medical studies the onset of menstruation can be predicted to occur within a certain period of time.

It has also been found that while women as a group will usually have a menstrual cycle range variation of from twenty-two through thirty-four days, most women will display a high degree of periodicity in the length of their menstrual cycles, although they will all vary from each other and from themselves from month to month. Most menstrual cycles are between twenty-two and thirty-four days long and vary from month to month by from two to eight days. Greater variations and sudden fluctuations in cycle duration may occur during periods of severe physical and/or emotional stress. However, if a woman's menstrual cycles over a period of eight to twelve months have varied between two extremes, e.g., twenty-six to twenty-nine days, the possibility of her next menstrual cycle falling outside of these limits is very small although the variations within these limits will still exist.

Thus, given the relationship between ovulation and the commencement of the next succeeding menstrual cycle, the period of fertility can be calculated by utilizing the variational extremes in menstrual cycle duration to establish a basic ovulation fertility period to which is added a predetermined number of days corresponding to the viable periods of the spermatozoa and ovum. The length of the resulting span of days, i.e., the fertile period, will vary in accordance with the daily spread between the "shortest" and "longest" cycle lengths. Since this calculation depends upon the characteristics of the individual menstrual cycles, it will be apparent that separate calculations must be performed for each woman based upon her own menstrual history. Although the calculations can be performed by counting backwardly the appropriate number of days on a calendar or by using pencil and paper, these methods are not only tedious, but are also subject to error because of the number of variables involved in the calculations.

The prior art contains a number of examples of fertility calculators which provide, in varying degrees of complexity, means for computing periods of fertility and sterility in female animals and human beings. One of the most complex and yet certainly an illustrative example of the prior art devices, is the rhythmeter for determining sterility and fertility disclosed in the patent to G. L. Tilbrook, No. Re 22,692, issued November 13, 1945. The Tilbrook device employs four superposed, separately rotatable disks having printed thereon an excessive amount of relatively complicated operating instructions and general information. The inherent complexity of the Tilbrook device is graphically demonstrated by the fact that the manual for the commercial version of the rhythmeter includes twenty nine pages of operating instructions and illustrations of various settings.

Other prior art calculators, as shown in the patents to De Cary et al., No. 2,034,027, issued March 17, 1936; Mansur, No. 2,118,354, issued May 24, 1938; Brandao, No. 2,350,219, issued May 30, 1944; and Fisher, No. 2,476,408, issued July 19, 1949, disclose fecundity computers based upon the similar concept of four relatively movable scales that generally take the form of four superposed, independently rotatable disks. In the prior art devices, the presentation of the menstrual cycle information is unnecessarily complex and the purpose of the device is often not apparent from an inspection of the calculator. Furthermore, the physical configuration of the four movable disks and the associated scales imposes a manipulative burden upon the user with a concomitant increase in the probability of an erroneous setting or reading of the calculator.

It is accordingly a general object of the present invention to provide a relatively simple and inexpensive menstrual calculator for determining the specific calendar days when a woman is fertile and infertile.

It is a specific object of the invention to provide a menstrual calculator having the minimum number of structural components consistent with the visual presentation of the required cycle information.

It is an object of the present invention that only a minimum amount of readily available information is required to use the calculator.

It is a feature of the present invention that the computation performed by the menstrual calculator is based upon input data representing variational extremes rather than variational averages.

It is another object of the present invention to provide a visual indication of the aforementioned periods of fertility and infertility with respect to a full twelve month calendar.

It is another feature of the invention that once the initial adjustment has been made for a woman's individual "shortest" and "longest" cycle lengths, only a single setting of the menstrual calculator is required to obtain the desired fertility information for each menstrual cycle.

It is still another feature of the invention that once the calculator has been set, the woman's menstrual history is retained until a change in cycle length necessitates a corresponding change in menstrual cycle information stored in the calculator.

It is a further object of the present invention to provide a menstrual calculator of sufficient operational simplicity that its purpose and method of operation are readily apparent from a visual inspection of the calculator without requiring elaborate operating instructions.

It is a still further object of the invention to provide a warning indication whenever the user attempts to set the calculator beyond certain predetermined limits.

It is also another object of the present invention to provide an easily constructed and relatively inexpensive menstrual calculator which fulfills the above-mentioned objects.

These objects and other objects and features of the present invention will be apparent from the following description of a preferred embodiment of the invention, selected for purposes of illustration, and shown in the accompanying drawings, in which.

Figure 1:
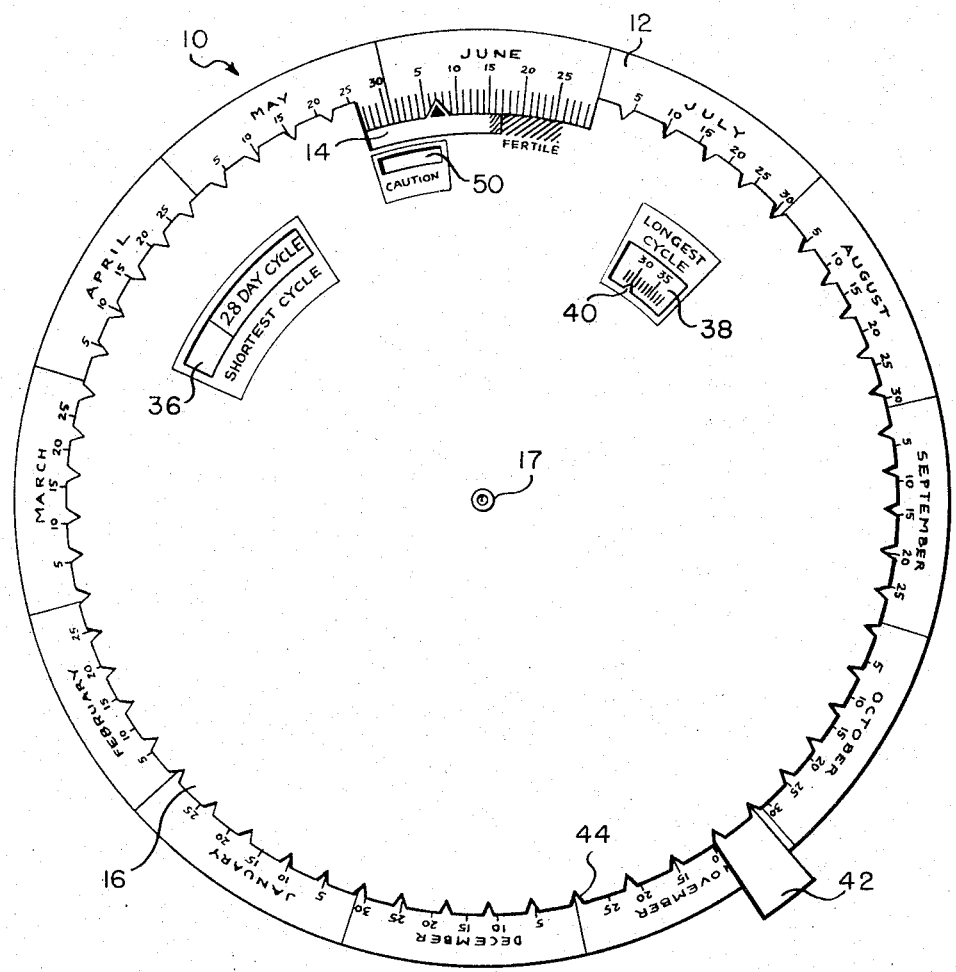
FIG. 1 is a plan view of a menstrual calculator constructed in accordance with the present invention showing the relationship of the month-day calendar scale, the fertile period, and the shortest and longest cycle indicia.

Turning now to the drawings and particularly to FIGURE 1 thereof, there is shown in plan view a preferred embodiment of the menstrual calculator constructed in accordance with the present invention and indicated generally by the reference numeral 10. It has been mentioned previously that one of the objects of the present invention is to provide a menstrual calculator that is relatively simple to operate and inexpensive to manufacture. This object is achieved by constructing the calculator 10 with a limited number of components that can be fabricated from relatively inexpensive materials.

The major components of the calculator are depicted in FIG. 1 and comprise three circular disks 12, 14 and 16 that are assembled in superposed relation for independent, coaxial rotation about a pivot 17. The disks 12, 14 and 16, shown in greater detail in FIGS. 2, 3 and 4, respectively, can be constructed or fabricated from any suitable material, such as, heavy paper board, metal or plastic. In selecting the type of material for constructing the menstrual calculator, the following factors will normally be considered: the cost of raw material; the relative ease of imprinting the appropriate informational material; the appearance of the finished product; and, the nature of the ultimate distribution market. It should be noted, however, that the particular type of construction material is not critical, provided the selected material has a sufficiently long life expectancy to fulfill the intended ultimate end use of the calculator.

Figure 2:
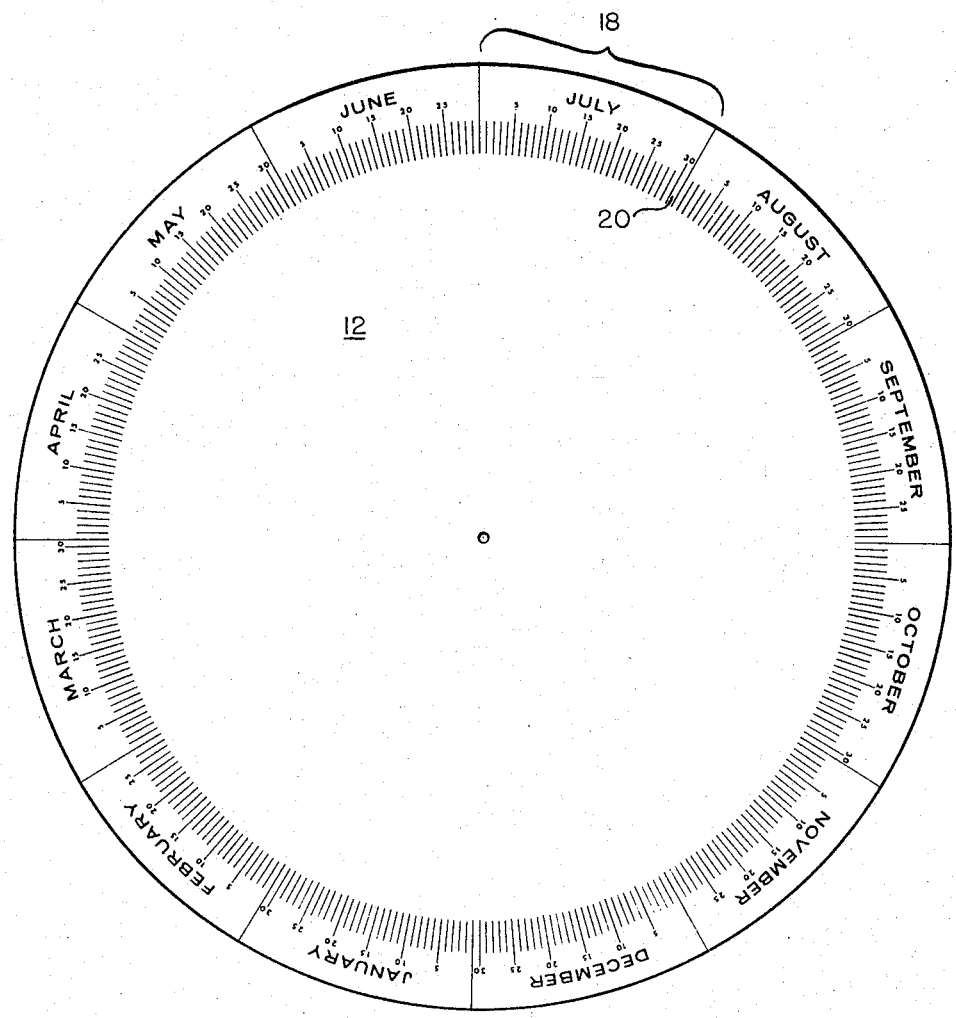
FIG. 2 is a plan view of the lower month-day calendar disk.
Figure 3:
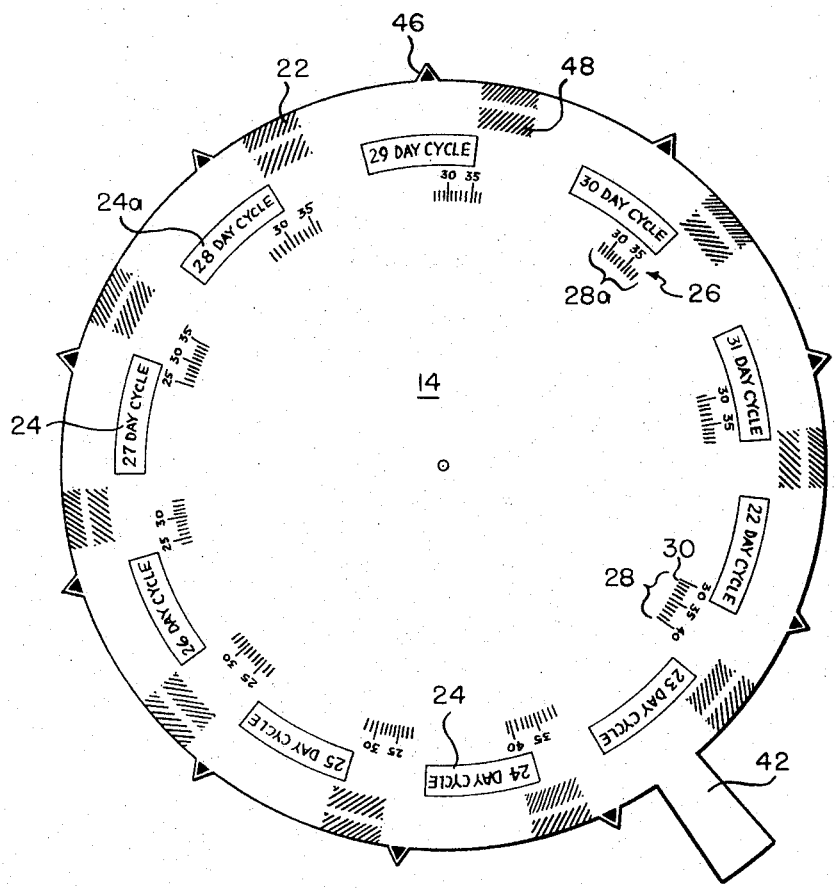
FIG. 3 is a plan view of the intermediate disk containing the shortest and longest cycle indicia and the basic fertile periods.

Referring now to FIGS. 1 and 2, the lower disk 12 contains the month-day calendar portion of the menstrual calculator 10. This disk is circumferentially divided into twelve monthly increments 18 that are subdivided into daily increments 20. It can be seen from an inspection of FIGS. 1 and 2 that the monthly increments 18 vary in angular width in accordance with the number of days in each month, while the daily increments 20 are of uniform angular width. The intermediate disk 14 shown in FIG. 3 is divided circumferentially into a plurality of fertile period increments 22. The angular width of the fertile period increments 22 is uniform and corresponds to the angular width of nine daily increments 20 on the lower disk calendar. However, it should be noted, that the angular width of nine daily increments 20 is numerically equal to a ten-day calendar period as shown in FIGURE 1.

The ten-calendar-day length of the fertile period increments 22 is established on the basis of current empirical medical knowledge. It has been mentioned previously that ovulation will occur sometime between the fourteenth and sixteenth days before the onset of the next succeeding menstrual cycle. If the life expectancy of the spermatozoa is assumed to be three days, then the basic fertile period must be extended to include the seventeenth, eighteenth and nineteenth days before the onset of the next menstrual cycle. Similarly, if the ovum remains viable for a period of two days from the time that the Graafian follicle ruptures, then a corresponding two-day period must be added to the end of the basic fertile period, i.e. conception is possible during the thirteenth and twelfth days preceeding the commencement of the next menstrual cycle. The fertile period thus runs from the nineteenth through twelfth days immediately preceding the next menstrual cycle. However, one day should also be added to the beginning and end of this time span to account for the possibility that the days of the week may not exactly coincide with the actual beginning of menstruation. Allowing for these two extra days also compensates for other practical user errors and provides a certain margin of safety.

On this basis, it can be seen that the fertile period occupies a span of ten days running from the twentieth through the eleventh days before the onset of the next menstrual cycle. If the menstrual length remains absolutely constant, the basic fertile period can be computed on the basis of ten calendar days. However, if the length of the menstrual cycle fluctuates between a "shortest" and a "longest" cycle length, then the length of the fertile period increment 22 must be increased to accommodate the shifting ovulation period. For example, if we assume a shortest cycle duration of twenty-eight days and a longest cycle duration of thirty days, then it can be seen that the fourteenth through sixteenth days preceding a twenty-eight day cycle will not coincide with the fourteenth through sixteenth days prior to a thirty-day cycle. The overlap or increase in the length of the fertile period can be expressed in terms of the longest cycle variation. Thus, for each day's increase in the length of the longest menstrual cycle over the shortest cycle, the length of the fertile period increment must be increased by one day and this one day must be added at the end of the fertile period.

Since the normal variation in cycle length is between two to eight days, it will be apparent that the computation required to determine the exact increase in the length of the fertile period is not insignificant and that when this computation is coupled with the problem of relating the result to calendar months and days, the "rhythm system" becomes practical only for the sophisticated user. However, with the menstrual calculator of the present invention, most women can now determine their fertile and infertile periods with a great degree of accuracy because the calculator automatically computes the correct number of days to be added to the basic fertile period to compensate for variations in cycle duration and then presents this information in a readily comprehensible form that is directly related to the months and days of a twelve-month calendar.

The automatic compensation of the basic fertile period for the variations in menstrual cycle duration and the automatic visual display of the resulting information is achieved in the fertility calculator of the present invention by means of a cooperative relationship between the intermediate disk 14 and the upper disk 16. Referring to FIG. 3, the intermediate disk 14 is provided with a plurality of circumferentially spaced shortest and longest cycle indicia 24 and 26, respectively. The indicia 24 and 26 may take a variety of forms, as hereinafter described, but as shown in FIG. 3, the shortest cycle indicia 24 are indicated alphanumerically while the longest cycle indicia 26 are shown as a numerical scale identified by the reference numeral 28.

The longest cycle indicia scale 28 comprises an arcuate scale of predetermined angular width that is subdivided into a plurality of daily increments 30 having the same angular width as the daily increments 20 on the lower disk calendar. The daily increments of the longest cycle indicia scale represent a progressively increasing predetermined number of days commencing with the numerical value of the corresponding shortest cycle indicia 24. For example, the longest cycle indicia scale 28a which corresponds to a twenty eight day shortest cycle, identified by the reference numeral 24a in FIGURE 3, commences with day twenty eight and runs through day thirty eight. A similar relationship exists between each of the other longest cycle indicia 28 and their corresponding shortest cycle indicia 24.

Figure 4:
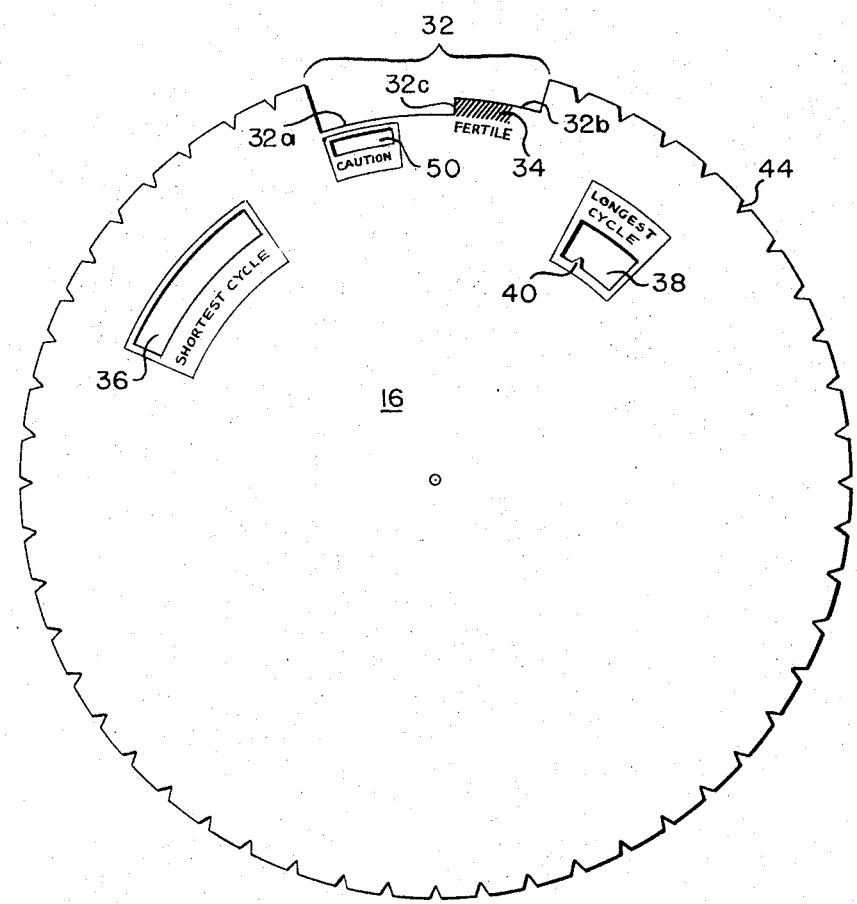
FIG. 4 is a plan view of the upper disk.

Turning now to the upper disk 16 illustrated in FIGURE 4, it can be seen that the disk has a reduced radius portion or indention 32 comprising 2 arcuate segments 32a and 32b of slightly different angular width and radial spacing from the center of the upper disk. Together, the two segments form a generally step-shaped indention. From an inspection of FIGURES 1, 3 and 4, it will be appreciated that the radial distance from the center of the intermediate disk 14 to the inner edge of the fertile period 22 is substantially the same as the radial distance from the center of the upper disk 16 to the arcuate segment 32a of indention 32. Thus, when the disks are placed in coaxial, superposed relation, as depicted in FIGURE 1, the fertile period 22 will be exposed to view as the upper disk is rotated clockwise with respect to the intermediate disk. Similarly, it can be seen that the radial distance from the center of the upper disk to the arcuate segment 32b corresponds to the radius of the intermediate disk 14. This physical relationship permits the upper disk segment 32b to function as a fertile period extending means 34 when the upper disk is rotated clockwise with respect to the intermediate disk.

The fertile period extending means 34 is identified by a suitable color or other marking which commences with the vertical "step" portion 32c of the indention and extends clockwise therefrom for an angular width corresponding to nine daily increments 20 on the long disk calendar scale. Preferably, the upper disk fertile period extending means 34 and the intermediate disk basic fertile period 22 have the same color or other identifying markings so that they will appear as a single band of color or uniform marking to the user.

The increase in the apparent fertile period that is produced by rotating the upper disk clockwise with respect to the intermediate disk is not a random increase, but instead, is mathematically related to the user's shortest and longest menstrual cycles. The mathematical relationship can be expressed in words as follows: the apparent numerical length in days of the fertile period must be increased by one day for each day that a selected longest cycle indicia numerically exceeds a selected shortest cycle indicia.

The incremental increase in the apparent fertile period by an angular width corresponding to the angular width of one daily increment 20 on the lower disk calendar scale is obtained in the preshent invention by the interaction of the structural components of the intermediate and upper disks 14 and 16, respectively. Referring to FIGURES 1 and 4, it can be seen that the upper disk 16 has two arcuate apertures or "windows" 36 and 38 that are marked "Shortest Cycle" and "Longest Cycle," respectively. The angular width of each aperture is slightly greater than the angular width of the corresponding shortest and longest cycle indicia, 24 and 26, respectively, in order to provide full visibility of the indicia when the menstrual calculator is set to a given pair of indicia as shown in FIGURE 1.

In addition to the two "windows," the upper disk 16 also has a longest cycle index 40 which is fixed with respect to the upper disk but movable relative to the intermediate disk 14. The longest cycle index 40 can take a variety of forms, such as, a line, a colored dot or as shown in FIGURES 1 and 4, a triangular pointer which partially overlies the longest cycle indicia scale 28 when the disks are assembled in superposed relation (FIGURE 1).

The index 40 is located at a position on the upper disk 16 that is determined by taking into account the placement of the intermediate disk's shortest and longest cycle indicia 24 and 26 and fertile period 22, as well as the spacing of the upper disk windows 36 and 38 and the location of the upper disk fertile period extending means 34. The index position can be established experimentally by rotating the intermediates and upper disks until a selected shortest cycle indicia 24 is visible in the upper disk window 36 and the upper disk fertile period extending means 34 exactly overlies the intermediate disk fertile period 22.

Given this arrangement, the apparent length of the fertile period will be ten days indicating that the shortest and longest menstrual cycles are numerically equal. Therefore, the longest cycle index 40 must be located at the longest cycle indicia scale daily increment 30 having a numerical value equal to the length in days of the selected shortest cycle indicia. It has already been noted that for each shortest cycle indicia 24 there is a corresponding longest cycle indicia 26 comprising a numerically increasing scale that commences with the number of days in the selected shortest menstrual cycle. Thus, when the longest cycle index 40 is set to the beginning of the first daily increment on the longest cycle indicia scale i.e. to day "twenty eight" for a twenty eight day shortest cycle, the fertile period extending means 34 will exactly overlap the intermediate disk fertile period 22 thereby indicating an apparent fertile period length of ten days.

In order to facilitate the relative rotation of the three disks with respect to each other, the intermediate disk 14 is provided with a tab 42 which, preferably, extends outwardly beyond the circumference of the lower disk 12 as shown in FIGURE 1. In addition, the circumferential edge of the upper disk 16 is notched with a plurality of serrations 44 that provide a convenient finger grip for the user.

The operation of the menstrual calculator 10 is quite simple and the purpose of the device is readily comprehended by the user upon a brief inspection of the calculator. These features are possible because the structural relationships of the components discussed above allow only the pertinent menstrual information to be visible to the user once the calculator has been set for a given menstrual history. The elimination of the extraneous information not only simplifies the operation of the calculator, but it also significantly reduces the possibility of an improper setting or incorrect reading of the calculator.

The actual operation of the menstrual calculator 10 can best be understood by referring to FIGURE 1 which depicts the assembled calculator in plan view. For purposes of discussion, let us assume a menstrual history in which the shortest cycle is twenty eight days and the longest cycle is thirty days. The shortest cycle is set by rotating the intermediate disk 14, by means of a tab 42, until the desired shortest cycle indicia 24 i.e., "28 DAY CYCLE," is visible in the upper disk shortest cycle window 36. The upper disk is then rotated relative to the intermediate disk until the longest cycle index 40 is set opposite the appropriate longest cycle indicia scale daily increment, in this case the numeral "30" which represents the thirty day longest cycle. The calculator is now set as shown in FIGURE 1.

It will now be appreciated that once the calculator has been set for the particular menstrual history, the calculator provides a storage function for this information. Subsequent changes in the cyclical variations can be compensated for by adjusting either the shortest or longest cycle indicia or both. Preferably, there should be enough friction between the intermediate and upper disks to prevent accidental rotation of the two disks relative to each other once the calculator has been set to display the desired menstrual history. This can be achieved by any one of a number of well known means, such as for example, treatment of the upper surface of the intermediate disk and the corresponding lower surface of the upper disk or use of a rubber or plastic grommet between the two disks.

With the calculator set for a twenty eight day shortest cycle and a thirty day longest cycle, it can be seen in FIGURE 1 that the fertile period visible to the user is automatically extended by two days in accordance with the formula discussed above. For purposes of clarity, the slanted lines shown in FIGURE 1 on the upper disk fertile period extending means 34 run at a slightly different angle from the corresponding lines on the intermediate disk fertile period 22. However, in actual practice, the markings or colors would normally be the same in order to provide a uniform appearance to the user.

Up to this point in the discussion, the extended fertile period has not been related to the actual calendar days of the month or months as the case may be. This is accomplished in the present invention by rotating the intermediate and upper disks as a unit until an intermediate disk beginning-of-cycle index 46 is opposite the calendar day on the lower disk 12 corresponding to the commencement day of the present menstrual cycle. For example, in FIGURE 1, the disks are set to indicate that the current cycle began on the seventh day of June. When this is done, the fertile period 22 and fertile period extending means 34 are automatically related to the actual calendar days thereby showing that the fertile period runs from the fifteenth day thru the twenty sixth day of June.

It will now be appreciated that while the total possible fertile period is automatically computed with reference to both the earliest possible onset of the next succeeding menstrual cycle and the latest possible onset of the next succeeding cycle as is necessary for accurate fertility information, the user does not have to determine when these future events will occur. Instead, the user merely has to remember events which have already taken place i.e. the day when the present cycle began and the shortest and longest cycles. Once the calculator has been set for a particular menstrual history, the user only has to remember the commencement date of the present cycle since the shortest and longest cycle information is stored automatically in the calculator. However, if the input data for the calculator should subsequently change, the appropriate longest or shortest cycle indicia can be corrected to reflect the new variational extremes.

If the variation in the menstrual cycle lengths are too great, accurate information concerning the fertile period cannot be calculated by the method described above or by any other method known to medical science. Based on currently available medical evidence, a variation of ten days between the shortest and longest cycles is about the maximum which will allow an accurate computation of the fertile period. Therefore, the user of the menstrual calculator must be warned not to attempt to use the calculator if the variations in cycle lengths exceed ten days.

In the present invention the warning function is provided by means of a cooperative relationship between the intermediate and upper disks 14 and 16, respectively. Looking at FIGURES 1, 3 and 4, it can be seen that the intermediate disk 14 has a separate, arcuate warning marking 48 spaced inwardly from each fertile period 22 and that the upper disk 16 has a corresponding arcuate aperture or window 50 which is labeled "CAUTION." The arcuate window 50 has the same radial distance as the warning markings 48 so that as the intermediate disk 14 is rotated with respect to the upper disk 16, the warning markings will appear in the window at predetermined intervals. Since the warning markings 48 have the same angular position as the corresponding fertile periods 22, the arcuate upper disk window 50 can be located counterclockwise of the fertile period extending means 34 by an angular distance equal to the angular width of the basic fertile period 22. Thus, when the fertile period extending means 34 is moved clockwise beyond the basic fertile period 22, as a result of attempting to set the longest cycle index 40 at a point beyond the longest cycle indicia scale 28, a portion of the warning marking 48 will appear in the window 50. It will be appreciated that the placement of the warning markings 48 and the upper disk window 50 is only illustrative and that the same warning function can be achieved by other arrangements without departing from the scope of the present invention.

Having described in detail the structure and operation of the embodiment of the present invention shown in FIGURES 1 through 4, I will now discuss the preferred alternate embodiments depicted in FIGURES 5 through 11. Referring back for a moment to FIGURE 1, it can be seen that the shortest and longest cycle indicia 24 and 26, respectively, are presented to the user through the corresponding upper disk windows 36 and 38. However, it may be desirable from a psychological standpoint to present the necessary menstrual cycle information in close proximity to the lower disk calendar scale. This objective is achieved in the alternate embodiments illustrated in FIGURES 5 through 11 by eliminating the double window presentation of the shortest and longest cycle indicia.

Figure 5:
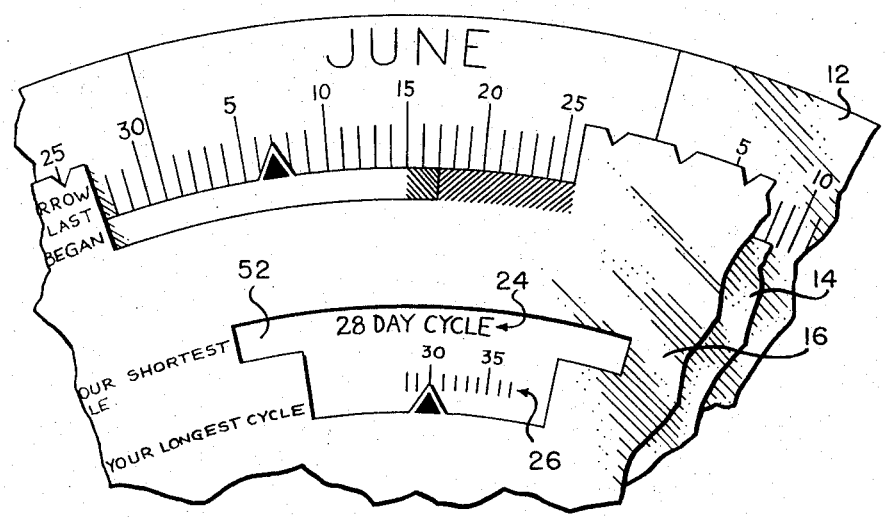
FIG. 5 is a fragmentary, enlarged plan view of an alternate embodiment of the invention showing a different configuration for the shortest and longest cycle indicia.
Figure 7:
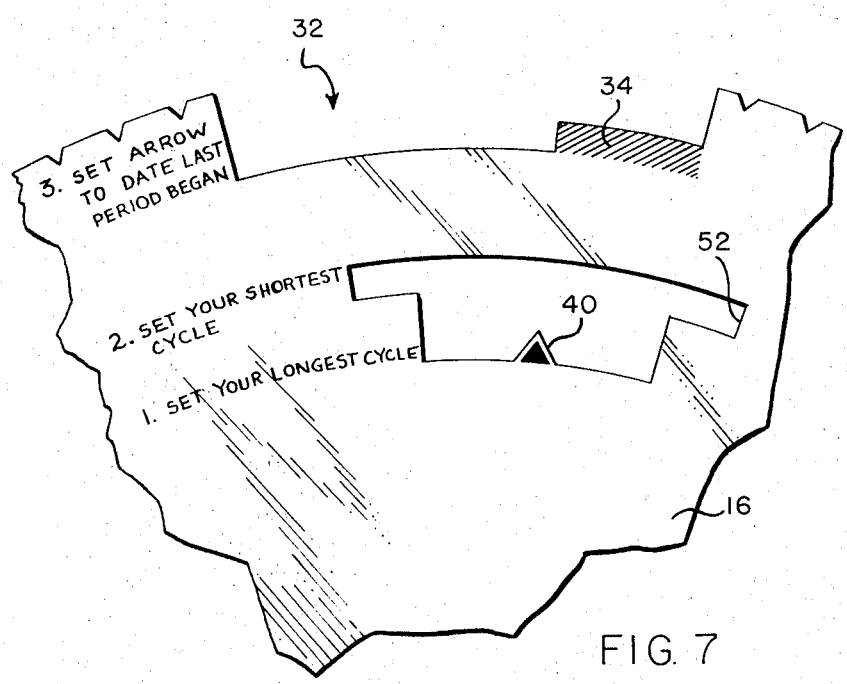
FIG. 7 is a fragmentary, enlarged plan view of the upper disk shown in the alternate embodiment depicted in FIG. 5.
Figure 6:
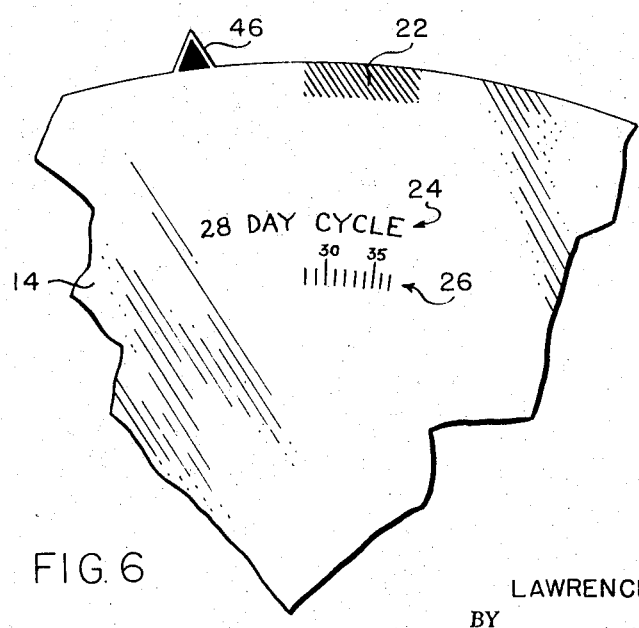
FIG. 6 is a fragmentary, enlarged plan view of the intermediate disk shown in the alternate embodiment depicted in FIG. 5.

Looking at FIGURES 5, 6 and 7, the upper disk 16 is provided with a single, generally T shaped window 52 through which can be seen the shortest and longest cycle indicia 24 and 26. The placement and angular relationships of the pairs of shortest and longest cycle indicia are apparent from an inspection of the partial plan view of the intermediate disk 14 shown in FIGURE 6. In order to simplify the discussion of the alternate embodiments, the same numbers have been used in FIGURES 5 through 11 to identify like components previously described in connection with FIGURES 1 through 4. Since the operation of the alternate embodiment depicted in FIGURES 5, 6 and 7 is readily apparent from the sequentially numbered instructions printed on the upper disk 16 as shown in FIGURE 7, no further description is deemed necessary.

Figure 8:
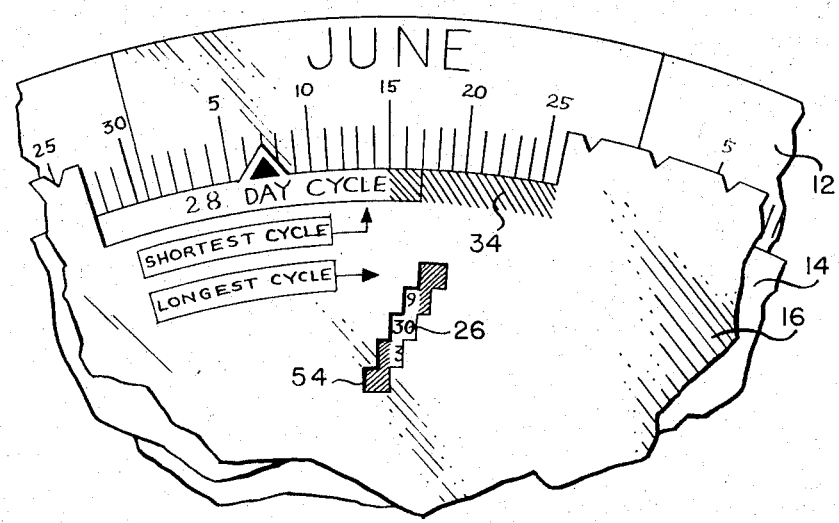
FIG. 8 is a fragmentary, enlarged plan view of another embodiment of the invention showing a different configuration for the longest cycle indicia.
Figure 10:
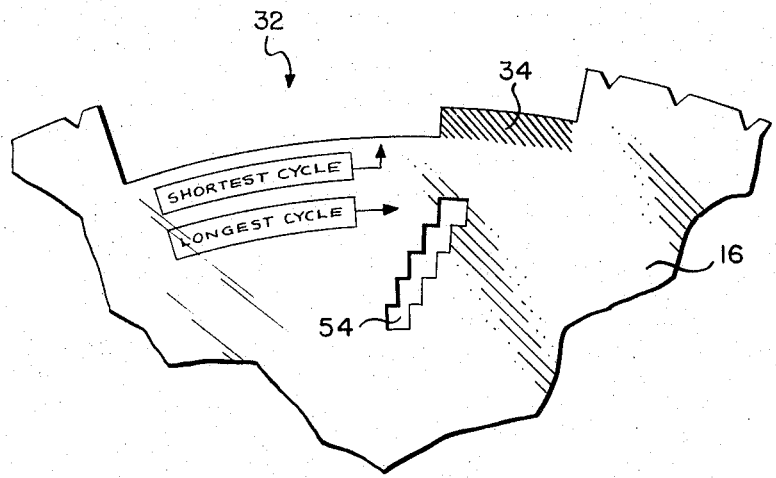
FIG. 10 is a fragmentary, enlarged plan view of the upper disk shown in the embodiment depicted in FIG. 8; and, FIG. 11 is a fragmentary, enlarged plan view of still another embodiment of the invention showing a different configuration for the longest cycle indicia and an upper disk having a magnifying lens mounted thereon for viewing the longest cycle indicia.
Figure 9:
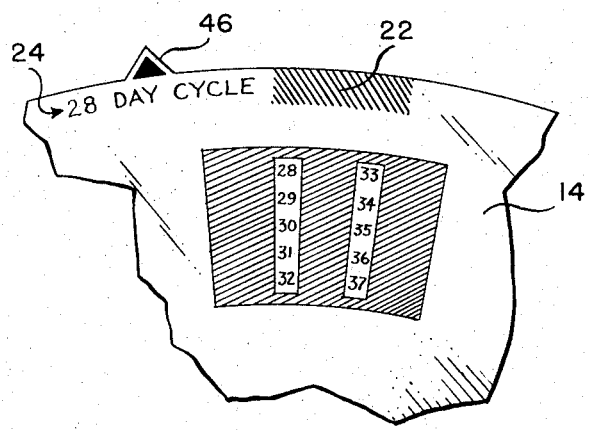
FIG. 9 is a fragmentary, enlarged plan view of the intermediate disk shown in the embodiment depicted in FIG. 8.

The alternate embodiment of the present invention illustrated in FIGURES 8, 9 and 10 is similar to the previously discussed embodiment, but employs a different arrangement for the shortest and longest cycle indicia. Looking at FIGURES 8 through 10, it can be seen that the shortest cycle indicia 24 are located counterclockwise from the corresponding intermediate disk basic fertile periods 22. The radial spacing of the shortest cycle indicia is designed so that the indicia will be visible through the upper disk reduced radius portion 32 when the disks are assembled in superposed relation as shown in FIGURE 8. The longest cycle indicia 26 are arranged numerically in two radial columns as shown in FIGURE 9. Preferably, the area surrounding the longest cycle number will be apparent when the disks are assembled in superposed relation.

The upper disk 16 is provided with a corresponding stair-shaped aperature or window 54. The angular width of each "step" is selected to allow only one longest cycle numeral to be visible when the calculator is set for a given menstrual history. As shown in FIGURE 8, the numeral "30" which represents a thirty day longest cycle is fully visible whereas only a portion of the "29" and "31" numerals are visible through the window. Since the operation of this embodiment is also readily apparent from an inspection of FIGURE 8, it will not be described herein.

Figure 11:
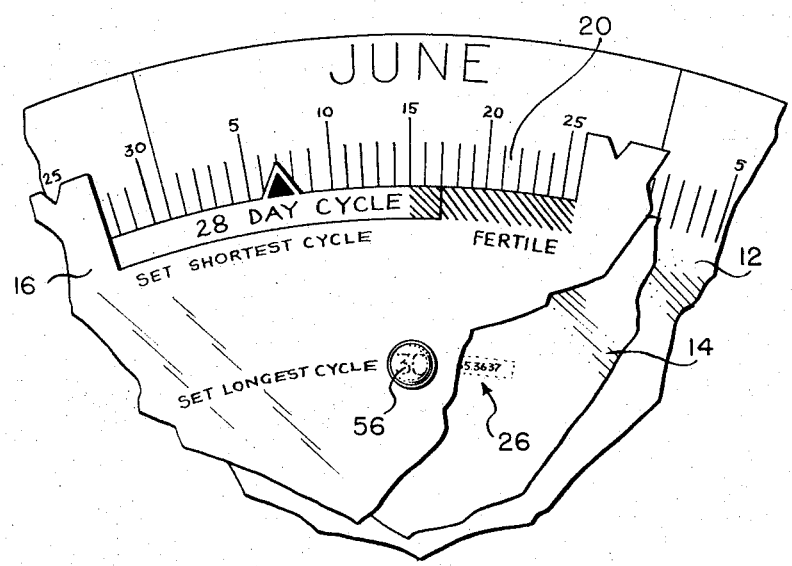

Another alternate embodiment of the invention is shown in FIGURE 11. The intermediate disk 14 is imilar to the intermediate disk illustrated in FIGURE 9 and discussed above with the exception of the configuration of the longest cycle indicia 26 which are circumferentially spaced at the same radial distance. Since the angular width of each longest cycle numeral is equal to the angular width of one daily increment 20 on the lower disk calendar scale, it will be appreciated that of necessity these numerals will be rather small in size. In order to make the numerals easily readable to the user, a magnifying lens 56 is mounted on the upper disk 16 with the center of the lens coinciding with the center of the numeral when the disks are assembled in superposed relation as shown in FIGURE 11. Preferably, the angular field of view of the magnifying lens is limited to approximately the angular width of one numeral i.e. the angular width of one daily increment 20, so that only one longest cycle numeral will be visible when the calculator is set for a particular menstrual history.

Although for purposes of simplification, no warning function has been shown for the three alternate embodiments discussed above, it should be understood that the warning can be provided for each of these embodiments in a similar manner to that described previously in connection with the embodiment illustrated in FIGURES 1 through 4. It should also be understood that the angular distances described above and shown in the drawings are determined by the selected menstrual cycle parameters and that if the parameters are changed as a result of new medical evidence, corresponding changes can be made in the calculator without departing from the scope of the present invention.

The menstrual calculator of the present invention has been described and illustrated in terms of circular scales or disks because it is believed at the present time that this configuration would be preferable for the female user of the calculator. However, other functionally equivalent configurations are, of course, possible. For example, the information on the lower disk can be placed on one linear scale and the intermediate disk information, including the shortest and longest cycle indicia, on a second relatively movable linear scale. These two scales together with an appropriate means for extending the apparent length of the fertile period, such as, a movable overlay, will provide the desired cycle information and fulfill the objects of the present invention.

Having described in detail the perferred embodiments of my invention, it will now be apparent to those skilled in the art that numerous modifications can be made without departing from the scope of the invention as defined in the following claims.

What I claim is:

1. A menstrual calculator comprising: a first support means having a first scale divided into a plurality of angular increments representing a predetermined number of calendar months, said monthly increments being subdivided into daily increments; a second support means having a second scale divided into a plurality of spaced fertile period increments of predetermined width representing a given number of calendar days, a corresponding plurality of spaced shortest and longest cycle indicia positioned on said second support means, and a beginning of cycle index located on said second support means; means for increasing the apparent numerical length in days of said scalar fertile period increments by one day for each day that a selected longest cycle indicia numerically exceeds a selected shortest cycle indicia; and, means for securing said support means to permit relative movement therebetween.

2. A menstrual calculator comprising: a first disk circumferentially divided into a plurality of angular increments representing a predetermined number of calendar months, said monthly increments being subdivided into daily increments; a second disk circumferentially divided into a plurality of spaced fertile period increments of predetermined angular width representing a given number of calendar days, a corresponding plurality of circumferentially spaced shortest and longest cycle indicia, and a beginning of cycle index positioned on said second disk; means for increasing the apparent length of said fertile period increments on said second disk by one day for each day that a selected longest cycle indicia numerically exceeds a selected shortest cycle indicia; and, means for securing said disks in superposed relation for independent coaxial rotation.

3. A menstrual calculator comprising: a lower disk circumferentially divided into twelve angular increments representing the calendar months, said monthly increments being subdivided into daily increments; an intermediate disk circumferentially divided into a plurality of spaced fertile period increments of predetermined angular width representing a given number of calendar days, a corresponding plurality of circumferentially spaced, shortest and longest cycle indicia, and a beginning of cycle index for each of said fertile period increments positioned counterclockwise thereof along the circumference by a predetermined angular distance that is a function of the numerical value of the corresponding shortest cycle indicia; an upper disk having means operative in conjunction with said intermediate disk longest cycle indicia for increasing the apparent numerical length in days of said fertile period increments on said intermediate disk by one day for each day that a selected longest cycle indicia numerically exceeds a selected shorest cycle indicia; and, means for securing said disks in superposed relation for independent coaxial rotation.

4. The apparatus of claim 3 wherein said longest cycle indicia comprises an arcuate scale of predetermined angular width subdivided into daily increments having the same angular width as the daily increments on said lower disk, said daily increments representing a progressively increasing predetermined number of days commencing with the numerical value of the corresponding shortest cycle indicia.

5. The apparatus of claim 4 wherein said upper disk means comprises a longest cycle index and a fertile period extending means, said index and fertile period extending means being positioned on said upper disk so that when the index is set against a selected longest cycle, said fertile period extending means increases the apparent length in days of said fertile period by one day for each day that the selected longest cycle numerically exceeds the corresponding shortest cycle.

6. The apparatus of claim 3 wherein said longest cycle indicia comprises a plurality of circumferentially spaced numbers for each corresponding shortest cycle, said numbers having a progressively increasing numerical value commencing with the numerical value of the corresponding shortest cycle.

7. The apparatus of claim 6 wherein said upper disk means comprises a magnifying lens and a fertile period extending means positioned on said upper disk so that when one longest cycle number is visible through said lens, said fertile period extending means increases the apparent length in days of said fertile period by one day for each day that the selected longest cycle numerically exceeds the corresponding shortest cycle.

8. The apparatus of claim 7 further characterized by said magnifying lens having a field of view limited to the angular width of one of said circumferentially spaced numbers.

9. The apparatus of claim 3 further characterized by means for providing a warning indication whenever said upper disk means increases the apparent length of said fertile period beyond a predetermined number of days.

10. The apparatus of claim 3 wherein said longest cycle indicia comprises a plurality of radially spaced numbers for each corresponding shortest cycle, said numbers having a progressively increasing numerical value commencing with the numerical value of the corresponding shortest cycle.

11. The apparatus of claim 10 wherein said upper disk means comprises a fertile period extending means and a stair-shaped window having a plurality of connected apertures each of which has an angular width substantially equal to the angular width of one of said radially spaced numbers.

References Cited

UNITED STATES PATENTS

| | | | |
|---|---|---|---|
| 2,190,640 | 2/1940 | Arajto | 235—85 |
| 2,512,915 | 6/1950 | Boutwell | 235—88 |
| 2,517,793 | 8/1950 | Lancaster | 235—88 |
| 2,650,764 | 9/1953 | Pirszel | 235—88 |
| 2,808,206 | 10/1957 | Gomez-Rodriguez | 235—85 |
| 3,278,118 | 10/1966 | Klein | 235—88 |
| 3,279,696 | 10/1966 | Sherman | 235—85 |

FOREIGN PATENTS 814,389 6/1959 Great Britain.

RICHARD B. WILKINSON, *Primary Examiner.*

STANLEY A. WAL, *Assistant Examiner.*